Patented Dec. 13, 1932

1,890,916

UNITED STATES PATENT OFFICE

WALDO L. SEMON, OF SILVER LAKE VILLAGE, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.  Application filed May 16, 1932. Serial No. 611,642.

This invention relates to the art of preserving rubber, either in a vulcanized or unvulcanized condition, and to rubber compositions so preserved.

It has heretofore been known that the deterioration which rubber normally undergoes, especially when exposed to light, heat or air, can be retarded by treating the rubber with certain organic substances generally known as anti-oxidants or age-resisters. The chief object of this invention, then, is to provide a new and very effective class of such anti-oxidants or age-resisters.

This invention, in brief, consists in treating rubber or rubber compositions with the products of the condensation of diarylamines and formaldehyde with the elimination of water. The reaction is preferably, although not necessarily, carried out in the presence of a condensation catalyst such as a non-oxidizing mineral acid.

For example, any diarylamine, such as diphenylamine, ditolylamine (either ortho, meta or para), dixylylamine, dicumylamine, phenyl-toluidine, phenyl-cumidine, phenyl-naphthylamine (alpha or beta), tolyl-naphthylamine, dinaphthylamine, phenylamino-biphenyl, naphthlyamino-biphenyl, phenyl-amino-tetraphenylmethane, phenylamino-indane, etc., may be reacted with formaldehyde with the elimination of water to give a condensation product which is an excellent anti-oxidant. Inasmuch as alkoxy substituted diarylamines are very similar in all their properties to the simple alkyl substituted compounds, the broad scope of this invention includes the reaction products of formaldehyde with such alkoxy diarylamines as methoxy diphenylamine, dimethoxy diphenylamine methoxy phenyl naphthylamine, etc., as well as corresponding ethoxy, propoxy, butoxy, and other like compounds. The reaction may be effected by heating the diarylamine directly with formaldehyde, or if desired, it may be effected in a suitable solvent medium such as benzene, but in any event the mixture should be heated to a temperature high enough to cause the condensation of the diarylamine and the formaldehyde with the elimination of the oxygen of the formaldehyde as water. If an oxygen-free diarylamine is employed, the product will then likewise be substantially oxygen-free.

The character of the product is somewhat dependent on the nature of the diarylamine selected, on the proportions of the reacting materials, and on the conditions of the reaction. For example, if diphenylamine is reacted with small proportions of formaldehyde in a neutral medium, there is a tendency toward the formation of tertiary amines such as tetraphenyl methylene diamine, whereas the formaldehyde in the presence of acid tends to link together the aromatic nuclei of two or more diphenylamine molecules, forming products which are secondary amines. In some cases cyclic products may be formed. Although the products of the reaction may be separated and separately employed, this is not always necessary nor even desirable. The products frequently are of high molecular weight and indefinite constitution, particularly when considerable proportions of the formaldehyde are employed, and therefore form a mixture of resinous consistency which is easily handled and readily incorporated into rubber or rubber compositions without any separation or purification of the individual constituents of the mixture. Both the crude and the purified products of the reaction have been found to be excellent anti-oxidants.

The products of this invention do not appreciably affect the rate of vulcanization of rubber, hence they may be freely added to existing rubber compositions without changing the time or temperature of vulcanization.

For example 42 parts by weight of 36% aqueous formaldehyde (one-half mol) are added to 676 parts of diphenylamine (four mols) in 400 parts of benzene which acts as an inert solvent. The mixture is refluxed on a steam bath for an hour and then heated more strongly to distil off the solvent and the unreacted diphenylamine, which amounts to about three-fourths of that originally used. The residue is a resinous mass which is a good anti-oxidant. A good yield of a pure crystalline substance melting at 103–106° C. may be obtained from this resinous material by the usual methods of purification, including fractional crystallization from appropriate solvents. This pure material has an empirical formula and chemical properties corresponding to tetraphenyl methylene diamine and is therefore believed to be identical with this substance.

Either the resinous mass or the pure product prepared as described above may be incorporated into any vulcanizable rubber composition before its vulcanization, preferably in the proportion of from 0.1% to 5% of the rubber in the composition, with good effect on the rate of deterioration of the rubber. For example ½% of either of these products when incorporated into a typical tire tread composition consisting of rubber mixed with re-enforcing pigments, sulphur, and an active organic accelerator such as hexamethylene tetramine, diphenylguanidine, or mercaptobenzothiazole, caused it to decrease in tensile strength only about one-half as fast as the composition without any age-resister.

As another specific example, 42 parts by weight of aqueous 36% formaldehyde solution are added to 676 parts of diphenylamine in about 400 parts of acetone containing about 2 parts of concentrated hydrochloric acid. The mixture is refluxed for two hours on a steam bath and then heated more strongly to distil off the acetone and the excess diphenylamine. The resinous residue contains considerable proportions of diphenyl diamino diphenyl methane, which may be separated and used alone if desired. This product, either in its resinous condition, or separated into its pure components, is an excellent age-resistor or anti-oxidant.

Other similar products may be prepared by increasing the proportion of formaldehyde or reacting the formaldehyde directly with the diarylamine without using a solvent, or by substituting any other diarylamine. For instance, formaldehyde may be added to molten phenyl beta-naphthylamine in equimolecular proportions to produce a very valuable product. In preparing any of these materials the mixture should be heated at some stage of the reaction to a sufficient temperature to split off water, and preferably to split off all the oxygen of the formaldehyde as water and produce a substantially oxygen-free product. A temperature of about 100° C. is ordinarily sufficient, although a higher temperature will frequently be employed to distill off excess unreacted amine or for other reasons.

It is to be understood that the effects of the new class of anti-oxidants in retarding the deterioration of rubber may be attained in many different ways. The anti-oxidants may be incorporated into the unvulcanized rubber either by addition to the rubber latex before its coagulation, in finely dispersed form, or they may be mixed into solid unvulcanized rubber, which may then be preserved either in its unvulcanized or in a vulcanized condition, or the anti-oxidants may be applied to the surface of unvulcanized or vulcanized rubber, as in solution or suspension or in powdered form. The term "treating" is therefore employed in the appended claims in a generic sense to embrace all such methods and their equivalents.

The term "rubber" is likewise employed in the claims in a generic sense to include caoutchouc, balata, gutta-percha, reclaimed rubber, rubber isomers, synthetic rubber and like products, whether or not admixed with fillers, pigments, vulcanizing and accelerating agents. The term "aryl" is employed in its usual sense to refer to aromatic monovalent hydrocarbon groups attached to the remainder of the molecule by a direct bond to the aromatic nucleus.

This application is a continuation in part of my co-pending application, Serial No. 301,438, filed August 22, 1928.

It is not my intention to limit myself wholly to the specific embodiments described herein, for many modifications are possible without exceeding the spirit and scope of the invention, but I intend to limit myself only as may be required by the prior art and as indicated in the appended claims.

I claim:

1. The method of preserving rubber which comprises treating rubber with the product of the condensation of a substance selected from the group consisting of diarylamines and alkoxy substituted diarylamines with formaldehyde with the elimination of water.

2. The method of preserving rubber which comprises treating rubber with a substantially oxygen-free condensation product of a diarylamine and formaldehyde.

3. The method of preserving rubber which comprises treating rubber with the product of the condensation of a mono-aryl substituted aniline and formaldehyde with the elimination of water.

4. The method of preserving rubber which comprises treating rubber with the product of the condensation of a diarylamine and formaldehyde in a neutral medium with the elimination of water.

5. The method of preserving rubber which comprises treating rubber with the product of the condensation of diphenylamine and formaldehyde in a neutral medium with the elimination of water.

6. The method of preserving rubber which comprises treating rubber with a tetra-aryl methylene diamine.

7. The method of preserving rubber which comprises treating rubber with tetraphenyl methylene diamine.

8. The method of preserving rubber which comprises treating rubber with the product of the condensation of diphenylamine and formaldehyde with the elimination of water.

9. The method of preserving rubber which comprises treating rubber with the product of the condensation of a diarylamine and formaldehyde prepared in the presence of an acid and with the elimination of water.

10. The method of preserving rubber which comprises treating rubber with a substantially oxygen-free condensation product of a diarylamine and formaldehyde prepared in the presence of an acid.

11. The method of preserving rubber which comprises treating rubber with the product of the condensation of diphenylamine and formaldehyde prepared in the presence of an acid and with the elimination of water.

12. The method of preserving rubber which comprises treating rubber with the substantially oxygen-free condensation product of diphenylamine and formaldehyde prepared in the presence of an acid.

13. The method of preserving rubber which comprises treating rubber with a substantially oxygen-free condensation product of a phenyl naphthylamine and formaldehyde.

14. A composition comprising rubber and the product of the condensation of a substance selected from the group consisting of the product of the condensation of diphenylamine and formaldehyde with the elimination of water.

15. A composition comprising rubber and the product of the condensation of diphenylamine and formaldehyde with the elimination of water.

16. A composition comprising rubber and the product of the condensation of a diarylamine and formaldehyde prepared in a neutral medium and with the elimination of water.

17. A composition comprising rubber and the product of the condensation of a diarylamine and formaldehyde prepared in the presence of an acid and with the elimination of water.

18. A vulcanized rubber composition vulcanized in the presence of the condensation product of a diarylamine and formaldehyde with the elimination of water.

19. A vulcanized rubber composition vulcanized in the presence of the condensation product of diphenylamine and formaldehyde with the elimination of water.

20. A vulcanized rubber composition vulcanized in the presence of the substantially oxygen-free condensation product of diphenylamine and formaldehyde.

In witness whereof I have hereunto set my hand this 12th day of May, 1932.

WALDO L. SEMON.